(12) United States Patent
Shkembi et al.

(10) Patent No.: US 9,293,813 B2
(45) Date of Patent: Mar. 22, 2016

(54) WINDOW ASSEMBLY WITH TRANSPARENT REGIONS HAVING A PERFORMANCE ENHANCING SLIT FORMED THEREIN

(71) Applicants: AGC Automotive Americas R&D, Inc., Ypsilanti, MI (US); AGC Flat Glass North America, Inc., Alpharetta, GA (US)

(72) Inventors: Ledion Shkembi, Lincoln Park, MI (US); Ming Lee, Ypsilanti, MI (US)

(73) Assignees: AGC AUTOMOTIVE AMERICAS R&D, INC., Ypsilanti, MI (US); AGC FLAT GLASS NORTH AMERICA, INC., Alpharetta, GA (US)

( * ) Notice: Subject to any disclaimer, the term of this patent is extended or adjusted under 35 U.S.C. 154(b) by 137 days.

(21) Appl. No.: 14/171,196

(22) Filed: Feb. 3, 2014

(65) Prior Publication Data
US 2014/0266931 A1    Sep. 18, 2014

Related U.S. Application Data

(60) Provisional application No. 61/793,958, filed on Mar. 15, 2013.

(51) Int. Cl.
*H01Q 1/32* (2006.01)
*G02B 5/20* (2006.01)
(Continued)

(52) U.S. Cl.
CPC ........ *H01Q 1/3291* (2013.01); *B32B 17/10036* (2013.01); *B32B 17/10174* (2013.01);
(Continued)

(58) Field of Classification Search
CPC ... H01Q 1/3291; H01Q 5/364; H01Q 1/1271; B32B 17/10036; B32B 17/1092

USPC .......................................... 343/172, 713, 906
See application file for complete search history.

(56) References Cited

U.S. PATENT DOCUMENTS 3,928,748 A    12/1975 Sauer
4,849,766 A    7/1989 Inaba et al.
(Continued)

FOREIGN PATENT DOCUMENTS

CN          102407753 A    4/2012
WO    WO 2012/079040 A1    6/2012
WO    WO 2012/090883 A1    7/2012

OTHER PUBLICATIONS

International Search Report for Application No. PCT/US2014/014439 dated Jun. 20, 2014, 5 pages.
(Continued)

*Primary Examiner* — Peguy Jean Pierre
(74) *Attorney, Agent, or Firm* — Howard & Howard Attorneys PLLC

(57) ABSTRACT

A window assembly for a vehicle includes a substrate that is substantially transparent and has a surface. A transparent layer is disposed on the surface and comprises a metal compound such that the transparent layer is electrically conductive. The transparent layer defines a first region and a second region that are spaced from one another by a section cut that is devoid of the transparent layer. The first and second regions are non-congruent to one another. A feeding arrangement is coupled to the first and second regions to energize the first and second regions such that the first and second regions operate as antenna elements. The first and second regions each define at least one performance enhancing slit that is devoid of the transparent layer. The slits are configured to operate as at least one of an impedance matching element and a radiation pattern altering element.

24 Claims, 11 Drawing Sheets

(51) Int. Cl.

| | | |
|---|---|---|
| *B32B 17/10* | (2006.01) | |
| *H01Q 1/12* | (2006.01) | |
| *H01Q 9/40* | (2006.01) | |
| *H01Q 21/28* | (2006.01) | |
| *H01Q 5/364* | (2015.01) | |
| *H01Q 5/40* | (2015.01) | |

(52) U.S. Cl.
CPC ..... *B32B17/10192* (2013.01); *B32B 17/10211* (2013.01); *B32B 17/10761* (2013.01); *G02B 5/208* (2013.01); *H01Q 1/1271* (2013.01); *H01Q 5/364* (2015.01); *H01Q 5/40* (2015.01); *H01Q 9/40* (2013.01); *H01Q 21/28* (2013.01)

(56) References Cited

U.S. PATENT DOCUMENTS

| | | | |
|---|---|---|---|
| 4,864,316 | A | 9/1989 | Kaoru et al. |
| 5,012,255 | A | 4/1991 | Becker |
| 5,528,314 | A | 6/1996 | Nagy et al. |
| 6,111,552 | A | 8/2000 | Gasser |
| 6,191,746 | B1 | 2/2001 | Nagy |
| 6,266,023 | B1 | 7/2001 | Nagy et al. |
| 6,317,090 | B1 | 11/2001 | Nagy et al. |
| 6,320,276 | B1 | 11/2001 | Sauer |
| 6,366,243 | B1 | 4/2002 | Isohatala et al. |
| 6,421,014 | B1 | 7/2002 | Sanad |
| 6,448,935 | B2 * | 9/2002 | Fuchs et al. .................... 343/713 |
| 6,809,692 | B2 | 10/2004 | Puente Baliarda et al. |
| 6,836,258 | B2 * | 12/2004 | Best et al. ...................... 343/909 |
| 7,289,074 | B2 * | 10/2007 | Yamaguchi ................... 343/713 |
| 7,656,357 | B2 * | 2/2010 | Ishibashi et al. .............. 343/713 |
| 8,466,842 | B2 | 6/2013 | Dai |
| 8,576,130 | B2 | 11/2013 | Dai |
| 8,692,716 | B2 * | 4/2014 | Biris et al. ............. 343/700 MS |
| 8,994,598 | B2 * | 3/2015 | Ogino et al. ................... 343/713 |
| 9,088,069 | B2 * | 7/2015 | Bungo |
| 2008/0169989 | A1 | 7/2008 | Li et al. |
| 2011/0279335 | A1 | 11/2011 | Degen et al. |
| 2012/0098716 | A1 | 4/2012 | Dai |
| 2013/0038492 | A1 | 2/2013 | Abe |
| 2013/0285861 | A1 | 10/2013 | Kagaya |

OTHER PUBLICATIONS

International Search Report for Application No. PCT/US2014/014430 dated May 22, 2014, 3 pages.

English language abstract and machine-assisted English translation for CN 102407753 extracted from the espacenet.com database on Jun. 9, 2014, 44 pages.

English language abstract for WO 2012/090883 extracted from espacenet.com database on Jun. 9, 2014, 33 pages.

* cited by examiner

WINDOW ASSEMBLY WITH TRANSPARENT REGIONS HAVING A PERFORMANCE ENHANCING SLIT FORMED THEREIN

RELATED APPLICATIONS

This application claims the benefit of U.S. Provisional Patent Application No. 61/793,958, filed on Mar. 15, 2013.

BACKGROUND OF THE INVENTION

1. Field of the Invention

The subject invention generally relates to a window assembly for a vehicle. More specifically, the subject invention relates to a window assembly having transparent regions with performance enhancing slits formed therein.

2. Description of the Related Art

Recently, there is an increasing demand for vehicle windows to have transparent films or coatings embedded within the windows for various purposes. Such transparent films or coatings often have metal compounds, such as metal oxides, which cause the transparent films or coatings to be electrically conductive. The transparent films or coatings have recently been applied to windows to reflect heat from sunlight penetrating the window. In particular, the transparent films or coatings reflect infrared radiation from sunlight. In so doing, the transparent films or coatings reduce the amount of infrared radiation entering an interior of the vehicle. The transparent films or coatings enable a lower interior temperature as compared to a vehicle having a window with no transparent films or coatings. As a result, during the warm months, less energy is required to lower the interior temperature of the vehicle. To maximize efficiency of the transparent films or coatings to reflect infrared radiation, the transparent films or coatings are often applied over a substantial majority of the window, often covering the entire field of view of the driver or occupant of the vehicle.

It is known to utilize the transparent films or coatings as transparent antenna elements with respect to the window of the vehicle. However, conventional transparent antennas utilized in windows encounter performance degradation as a result of ever-increasing electromagnetic interference. Thus, there remains a need to control radiation patterns and impedance characteristics of such transparent antennas employed on windows. Additionally, conventional transparent antennas utilized in windows are typically configured to operate within only narrow frequency ranges. As such, conventional transparent antennas have limited application.

SUMMARY OF THE INVENTION AND ADVANTAGES

The invention provides a window assembly for a vehicle. In one embodiment, the window assembly includes a substrate that is substantially transparent and has a surface. A transparent layer is disposed on the surface and comprises a metal compound such that the transparent layer is electrically conductive. The transparent layer defines a first region and a second region that are spaced from one another by a section cut that is devoid of the transparent layer. The first and second regions are non-congruent to one another. A feeding arrangement is coupled to the first and second regions to energize the first and second regions. The first region defines a first performance enhancing slit that is devoid of the transparent layer. The second region defines a second performance enhancing slit that is devoid of the transparent layer.

Accordingly, the transparent layer of the window assembly advantageously reflects infrared radiation while simultaneously providing an antenna configuration having broad application. Specifically, the window assembly is able to transmit and/or receive radio signals within a broad range of frequencies. Additionally, the performance enhancing slits advantageously provide greater control over radiation patterns and impedance characteristics of the window assembly. The performance enhancing slits ensure optimal efficiency of the window assembly in transmitting and/or receiving RF signals. Moreover, the non-congruent regions allow for first and second regions that operate at different frequencies thereby providing diversified antenna functionality to the window assembly. The non-congruent first and second regions further allow for versatility in geometric design of the antennas.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
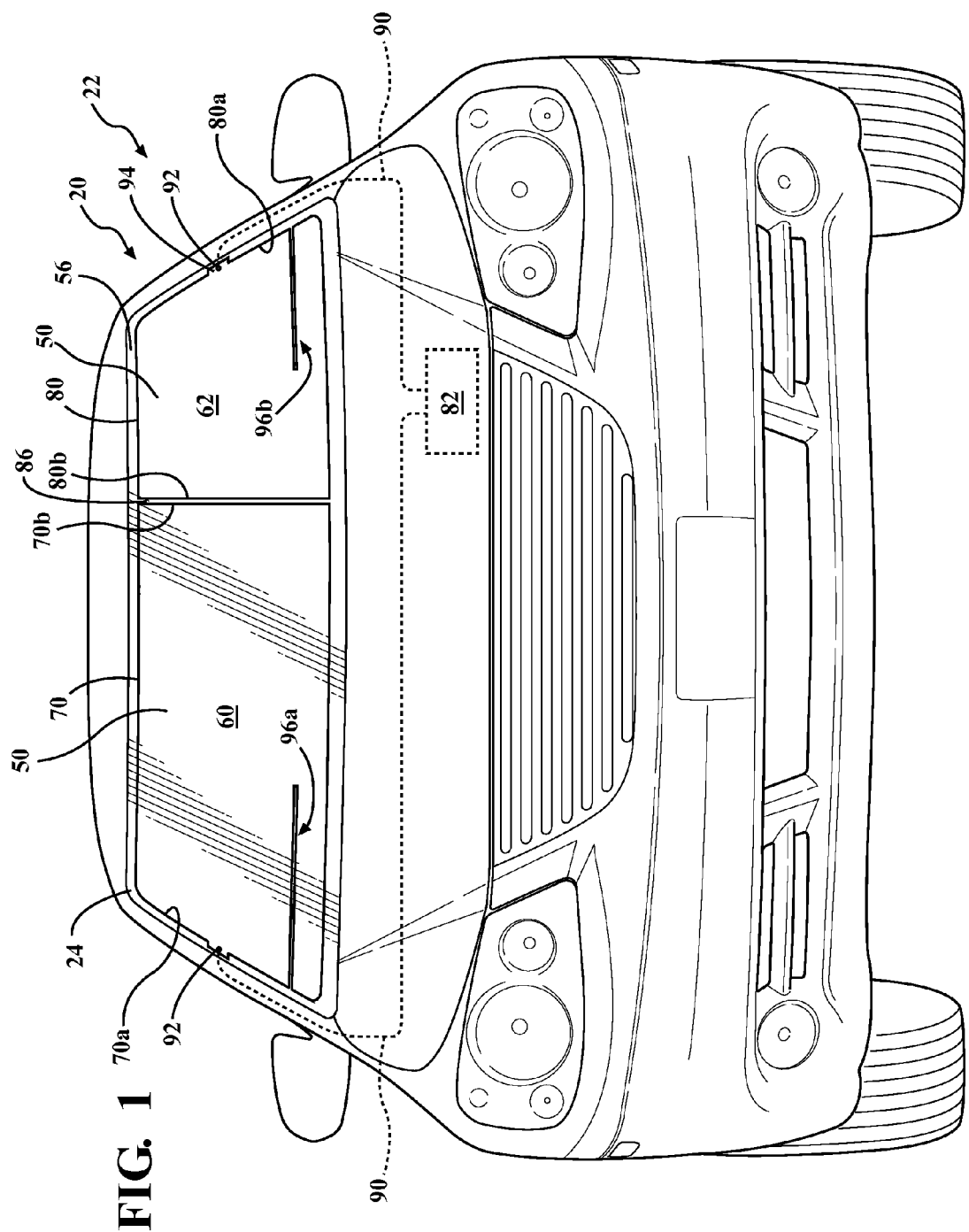
FIG. 1 is a perspective view of a vehicle having a window assembly with a transparent layer disposed on a substrate and defining first and second non-congruent regions each having a performance enhancing slit and each connected to an antenna receiver, according to one embodiment of the invention.

Referring to the Figures, wherein like numerals indicate corresponding parts throughout the several views, a window assembly is generally shown at 20. As shown in FIG. 1, the window assembly 20 is preferably for a vehicle 22. The window assembly 20 may be a front window (windshield) as illustrated in FIG. 1. Alternatively, the window assembly 20 may be a rear window (backlite), a roof window (sunroof), or any other window of the vehicle 22. Typically, the vehicle 22 defines an aperture and the window assembly 20 closes the aperture. The aperture is conventionally defined by a window frame of the vehicle 22.

The window assembly 20 includes a substrate 24 which is substantially transparent. As utilized herein, the term "transparent" refers to visual transparency to light. The term "substantially transparent" is defined generally as having a visible light transmittance of greater than 60 percent. In one embodiment, the visible light transmittance of the substrate 24 is greater than 75 percent. In yet another embodiment, the visible light transmittance of the substrate 24 is greater than 90 percent.

Figure 10:
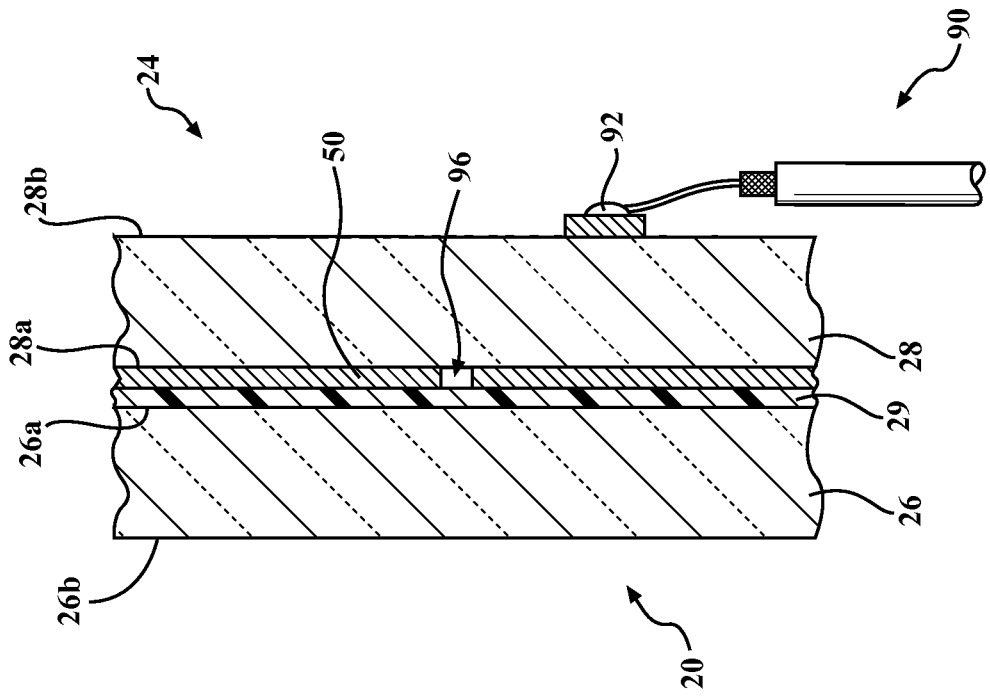
FIG. 10 is a cross-sectional partial view of the window assembly having the transparent layer disposed on an outer surface of an interior substrate and a feeding element abutting and in direct electrical connection with the transparent layer, according to one embodiment of the invention.
Figure 11:
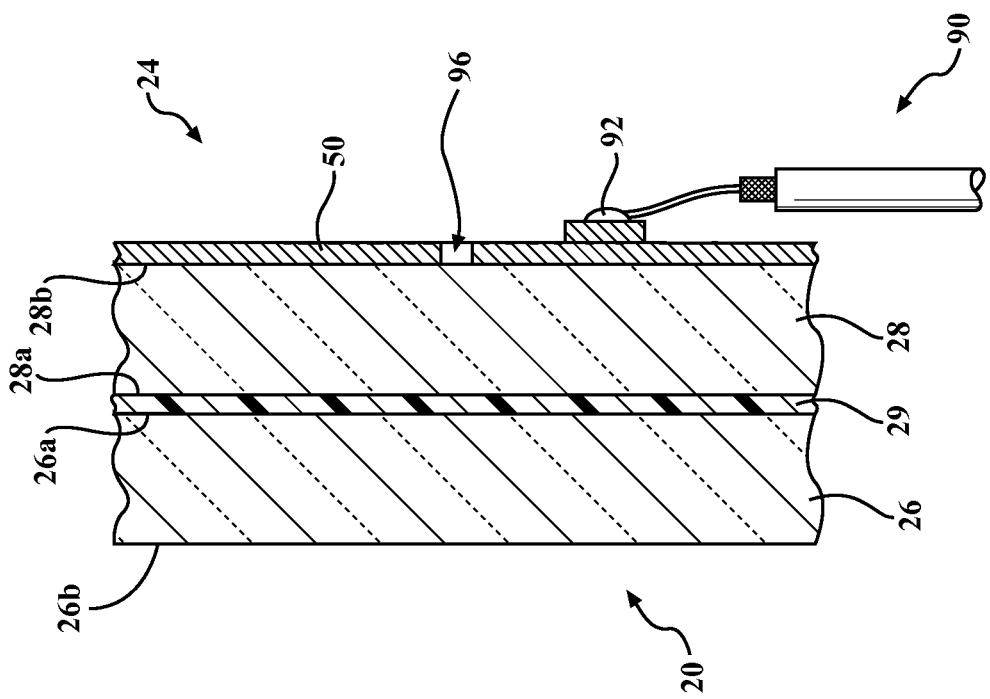
FIG. 11 is a cross-sectional partial view of the window assembly having the transparent layer disposed between the interior substrate and an exterior substrate and the feeding element spaced from and capacitively coupled to the transparent layer, according to another embodiment of the invention.

In one embodiment, the substrate 24 is a single, integrally formed piece. In another embodiment, as illustrated in FIGS. 10 and 11, the substrate 24 includes an exterior substrate 26 and an interior substrate 28 disposed adjacent the exterior substrate 26. The exterior substrate 26 is disposed parallel to and spaced from the interior substrate 28. In this embodiment, the exterior and interior substrates 26, 28 are joined together to form the substrate 24. Preferably, the exterior and interior substrates 26, 28 are panes of glass. The panes of glass are preferably automotive glass and, more specifically, soda-lime-silica glass. However, the exterior and interior substrates 26, 28 may be plastic, fiberglass, or other suitable electrically non-conductive and substantially transparent material.

Typically, the exterior and interior substrates 26, 28 are electrically non-conductive. As mentioned herein, the term "non-conductive" refers generally to a material, such as an insulator or dielectric, that when placed between conductors at different electric potentials, permits a negligible current to flow through the material. The exterior and interior substrates 26, 28 are also substantially transparent to light. However, the exterior and interior substrates 26, 28 may be colored or tinted.

The substrate 24 may include a plurality of surfaces. For example, as shown in FIGS. 10 and 11, each of the exterior and interior substrates 26, 28 has an inner surface 26a, 28a and an outer surface 26b, 28b. The outer surface 26b of the exterior substrate 26 typically faces an exterior of the vehicle 22. The outer surface 28b of the interior substrate 28 typically faces an interior of the vehicle 22. The inner surfaces 26a, 28a of the exterior and interior substrates 26, 28 typically face one another when the exterior and interior substrates 26, 28 are joined together to form the substrate 24.

As shown in FIGS. 2-9, the substrate 24 defines a perimeter 30. The perimeter 30 may be defined alternatively as a peripheral edge of the substrate 24. The perimeter 30 typically includes an upper perimeter edge 30a and an opposing lower perimeter edge 30b. The perimeter 30 generally includes opposing side perimeter edges 30c, 30d which are connected to the upper and lower perimeter edges 30a, 30b. As used herein, the term "upper" and "lower" are utilized to orient the perimeter 30 of the substrate 24 with respect to surface of the earth such that the upper perimeter edge 30a is higher in elevation from the surface of the earth than the lower perimeter edge 30b. However, the terms "upper" and "lower" are not intended to limit the orientation of the upper and lower perimeter edges 30a, 30b. As such, the upper and lower perimeter edges 30a, 30b may have alternative orientations without departing from the scope of the invention. Furthermore, the upper, lower, and/or side perimeter edges 30a, 30b, 30c, 30d may be curved or linear.

When utilized as the windshield of the vehicle 22, the perimeter 30 of the substrate 24 typically has a trapezoidal configuration, as shown in FIGS. 1-9. However, the perimeter 30 of the substrate 24 may have other shapes not specifically described herein.

Figure 3:
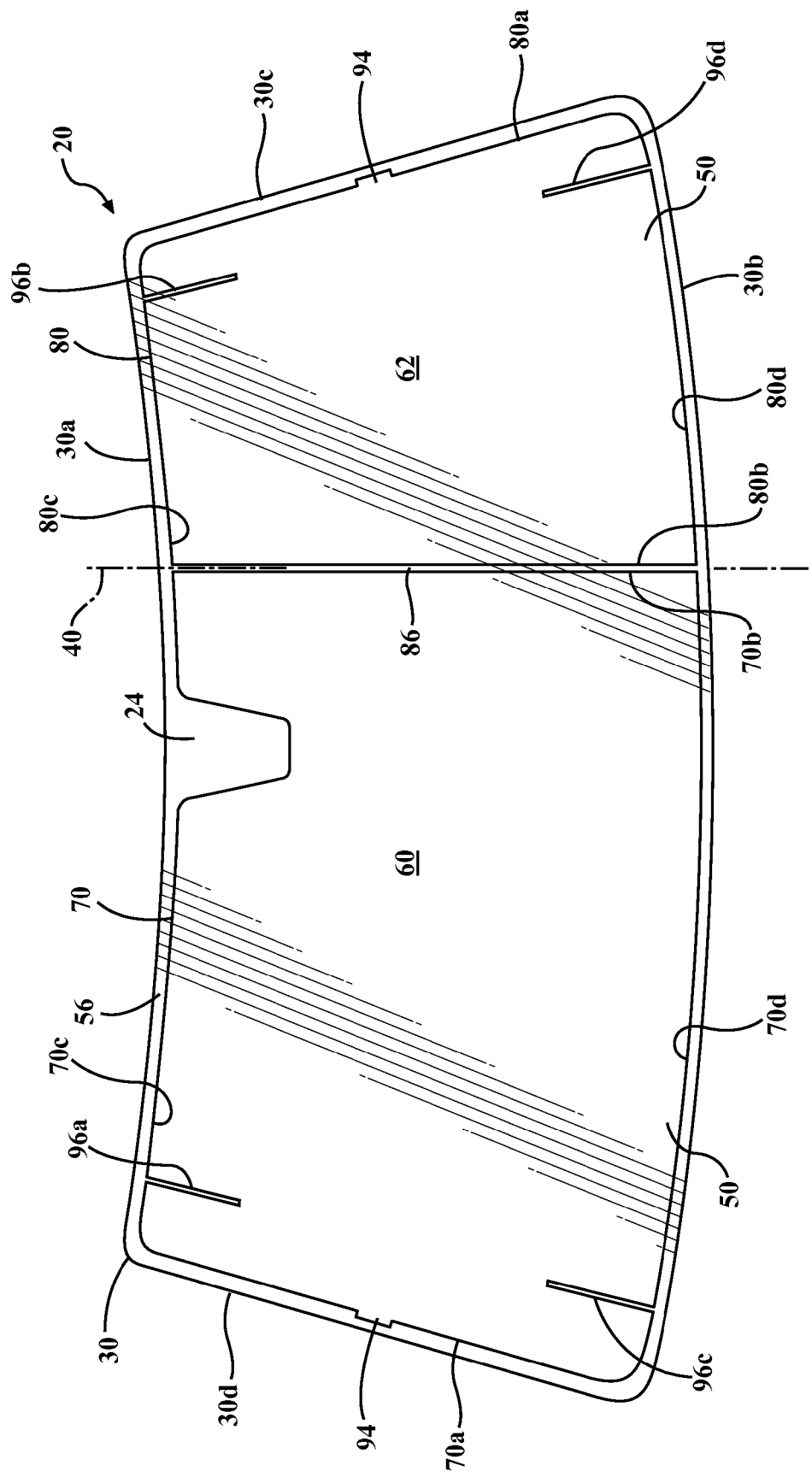
FIG. 3 is a plan view of the window assembly having the first and second non-congruent regions each defining two slits, according to another embodiment of the invention.
Figure 4:
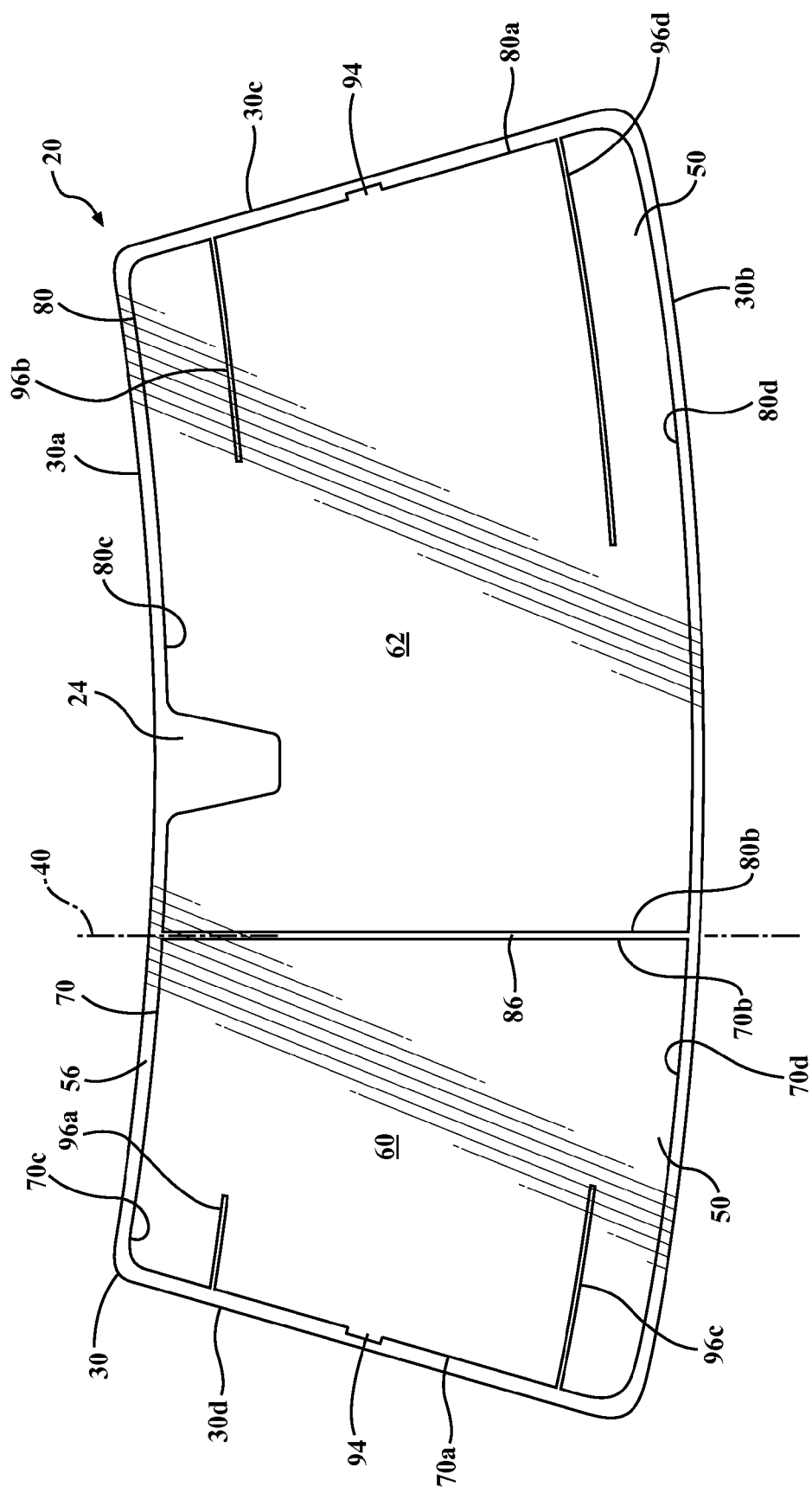
FIG. 4 is a plan view of the window assembly having the first and second non-congruent regions each defining two slits, with each slit extending from a periphery of one of the first and second regions, according to yet another embodiment of the invention.
Figure 5:
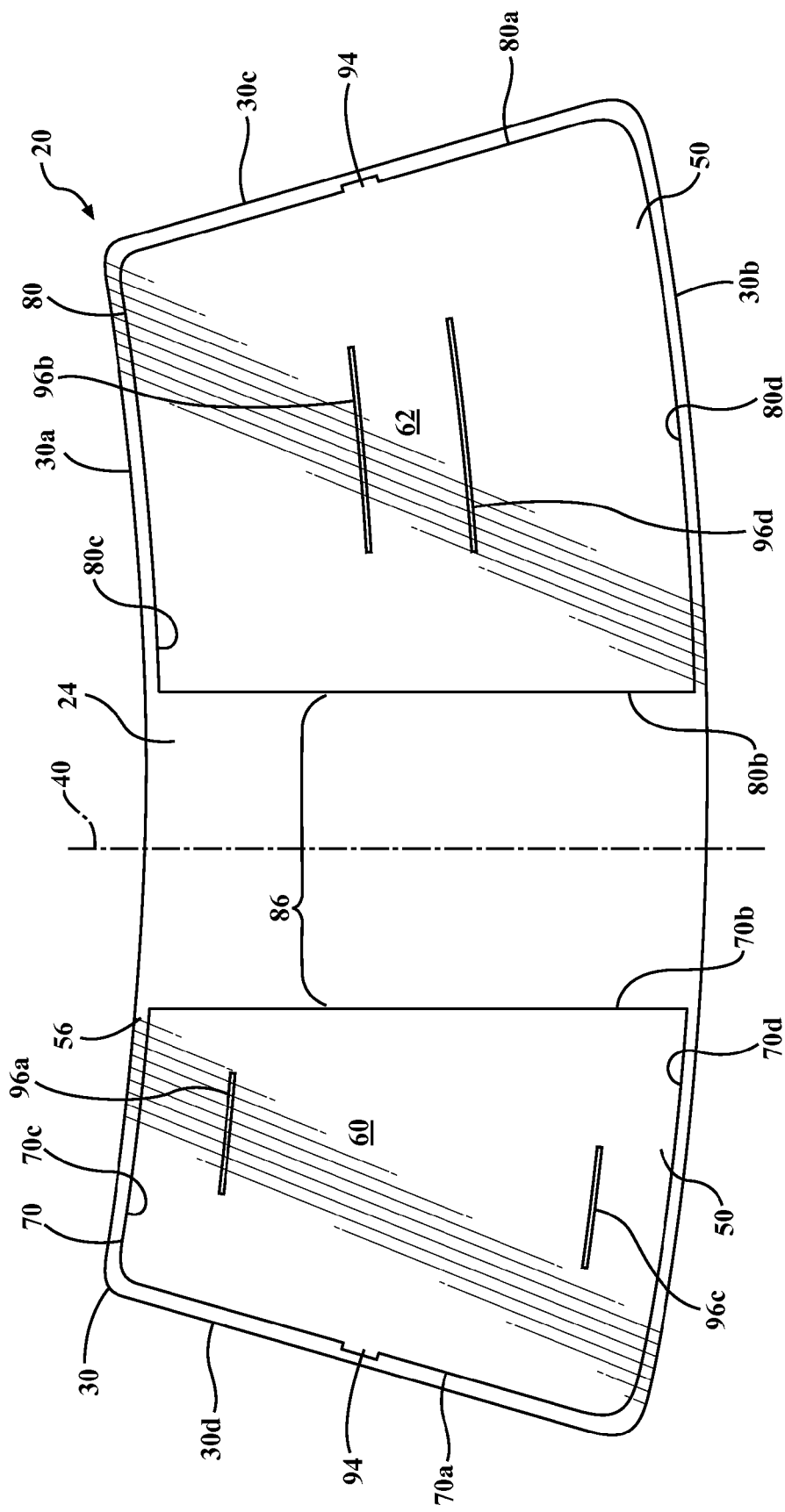
FIG. 5 is a plan view of the window assembly having the first and second non-congruent regions separated by a widened section cut, with the first and second non-congruent regions each defining two slits that are surrounded by the transparent layer, according to another embodiment of the invention.
Figure 6:
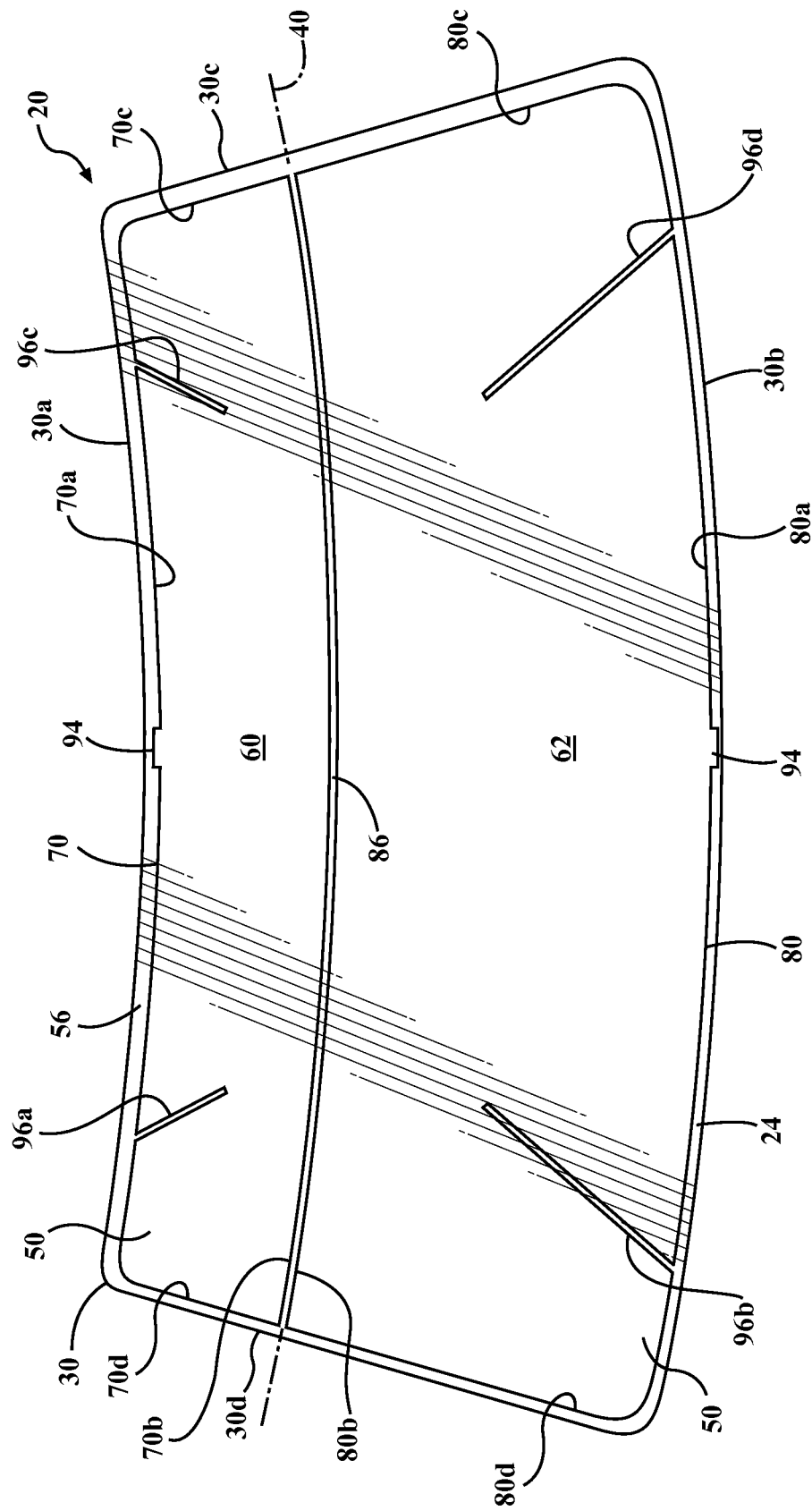
FIG. 6 is a plan view of the window assembly having the first and second non-congruent regions each defining two slits disposed at predetermined angles, according to another embodiment of the invention.

As shown in FIGS. 3-5, an axis 40 extends vertically between the upper and lower perimeter edges 30a, 30b of the substrate 24. The axis 40 in FIGS. 3-5 generally divides the perimeter 30 of the substrate 24 into two non-congruent areas. In FIG. 6, the axis 40 extends horizontally between the side perimeter edges 30c, 30d. In this embodiment, the axis 40 is positioned to divide the perimeter 30 of the substrate 24 into two non-congruent areas.

As shown throughout the Figures, the window assembly 20 includes a transparent layer 50. The transparent layer 50 is disposed on the surface of the substrate 24. In one embodiment, as shown in FIG. 10 the transparent layer 50 is disposed on the outer surface 28b of the interior substrate 28. In another embodiment, as shown in FIG. 11, the transparent layer 50 is disposed between the inner surface 26a of the exterior substrate 26 and the inner surface 28a of the interior substrate 28. In such instances, the transparent layer 50 is protected from direct contact with environmental factors which may damage the transparent layer 50. The transparent layer 50 may disposed on other surfaces of the window assembly 20. For example, the transparent layer 50 may be disposed on the inner surface 28a of the interior substrate 28 or the inner or outer surface 26, 26b of the outer substrate 26.

Although not required, an interlayer 29 may be disposed between the inner surfaces 26a, 28a of the exterior and interior substrates 26, 28, as illustrated in FIGS. 10 and 11. Preferably, the interlayer 29 bonds the exterior and interior substrates 26, 28 and prevents the window assembly 20 from shattering upon impact. Furthermore, the interlayer 29 typically is substantially transparent to light and includes a polymer or thermoplastic resin, such as polyvinyl butyral (PVB). However, other suitable materials for implementing the interlayer 29 may be utilized. Conventionally, the interlayer 29 has a thickness of between 0.5 mm to 1 mm.

The interlayer 29 may be disposed adjacent the transparent layer 50. In one embodiment, as shown in FIG. 10, the interlayer 29 is disposed between the transparent layer 50 and the inner surface 26a of the exterior substrate 26. Alternatively, the transparent 50 may be disposed between the interlayer 29 and the inner surface 28a of the interior substrate 28. Preferably, the window assembly 20 includes the transparent layer 50 and interlayer 29 sandwiched between the exterior and interior substrates 26, 28 such that the interlayer 29 and the transparent layer 50 are abutting the inner surfaces 26a, 28a of the exterior and/or interior substrates 26, 28. Although not shown in the Figures, it is to be appreciated that the transparent layer 50 may be embedded within the interlayer 29 such that the transparent layer 50 is sandwiched between the interlayer 29 on both sides.

The transparent layer 50 is substantially transparent to light. Accordingly, a driver or occupant of the vehicle 22 may see through the substrate 24 having the transparent layer 50. The transparent layer 50 preferably reflects heat from sunlight penetrating the substrate 24. As such, the transparent layer 50 reduces transmission of infrared radiation through the substrate 24. The transparent layer 50 may further operate as a defogging or a defrosting element to provide heating capability to the substrate 24.

In one embodiment, the transparent layer 50 is a film. In another embodiment, the transparent layer 50 is a coating. The transparent layer 50 may be applied to the surface of the substrate 24 according to any suitable method, such as chemical vapor deposition, magnetron sputter vapor deposition, spray pyrolysis, and the like.

The transparent layer 50 includes a metal compound such that the transparent layer 50 is electrically conductive. As mentioned herein, the term "electrically conductive" refers generally to a material, such as a conductor, exhibiting low electrical resistivity for effectively allowing flow of electric current through the material. Preferably, the metal compound includes a metal oxide. However, the metal compound may also include a metal nitride, and the like. The metal oxide may include a tin oxide, such as indium tin oxide, or the like. However, the transparent layer 50 may include other metal oxides, including, but not limited to, silver oxide. The metal compound may also be doped with an additive, such as fluorine. Specifically, the additive may be included in the metal compound to optimize the light transmittance and electrical resistivity of the transparent layer 50. The transparent layer 50 may have any suitable electrical sheet resistance quantifying an ability of the transparent layer 50 to oppose flow of electrical current through the transparent layer 50. The sheet resistance may also be known as a surface resistance. In one example, the transparent layer 24 has a sheet resistance in a range between 0.5-20 $\Omega$/square.

In one embodiment, the transparent layer 50 occupies at least a majority of the surface of the substrate 24. As used herein, majority is defined as greater than 50 percent of the surface area of the substrate 24. Generally, the transparent layer 50 covers at least a majority of the surface for maximizing the reduction of transmission of infrared radiation through the substrate 24. In other embodiments, the transparent layer 50 may occupy a minority of the surface. Alternatively, the transparent layer 50 may occupy an entirety of the substrate 24 such that the transparent layer 50 extends to the perimeter 30 of the substrate 24. The transparent layer 50 may define a shape substantially similar to the perimeter 30 of the substrate 24. Alternatively, the transparent layer 50 may have any suitable shape.

As shown in FIGS. 1-9, an outer region 56 may be formed on the substrate 24 between the transparent layer 50 and the perimeter 30 of the substrate 24. The outer region 56 is devoid of the transparent layer 50 and is therefore, electrically non-conductive. The outer region 56 has a width defined as a distance between transparent layer 50 and the perimeter 30 of the substrate 24. Preferably, the width is greater than 0 mm and less than 200 mm.

Figure 2:
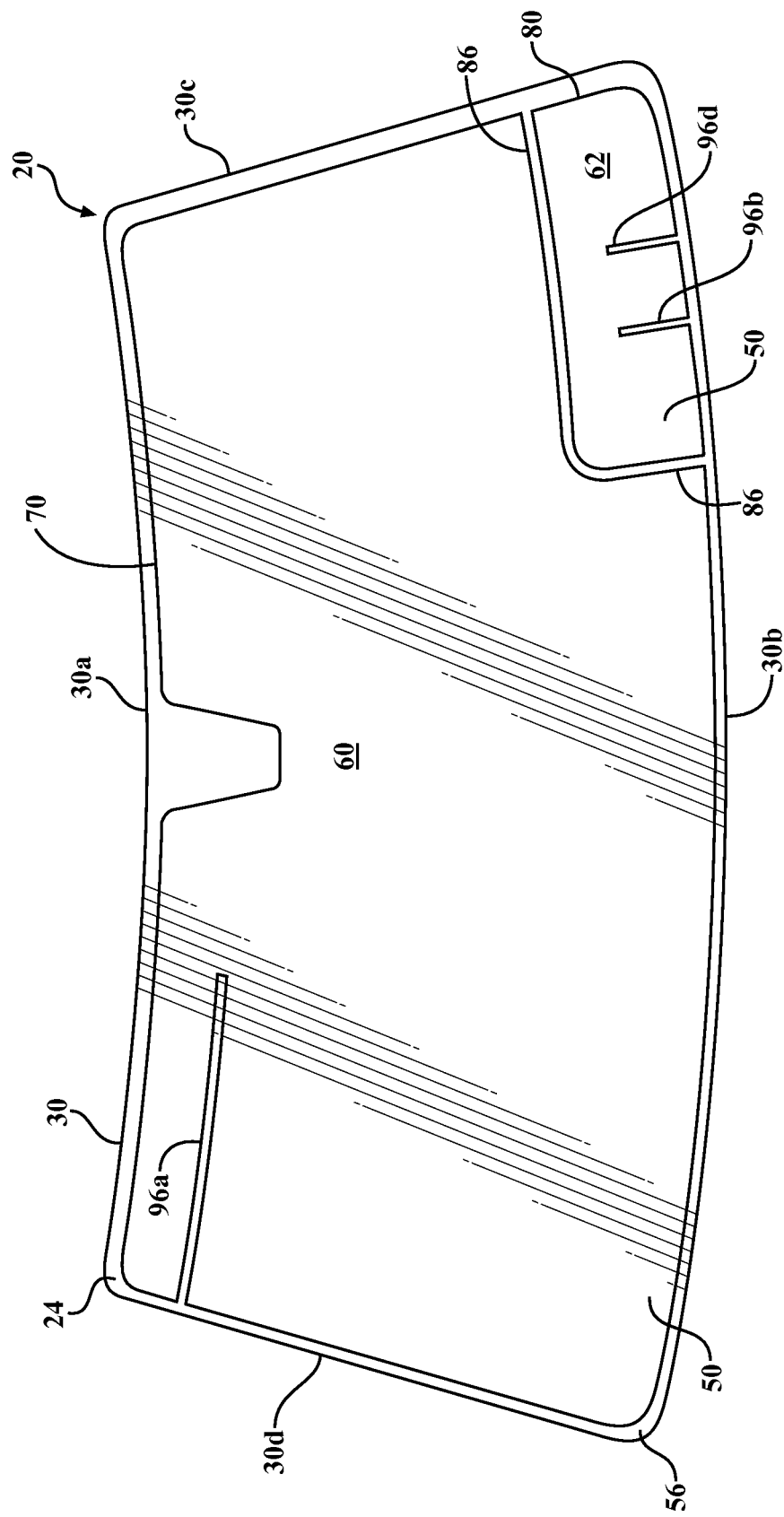
FIG. 2 is a plan view of the window assembly having the first and second non-congruent regions including the slits formed therein, according to another embodiment of the invention.

A vehicle device, such as a mirror or rain sensor, may be attached or mounted to the substrate 24. Presence of the transparent layer 50 at a location where the vehicle device attaches to the substrate 24 may adversely affect performance of the vehicle device. Therefore, the transparent layer 50 may include an opening, typically near the upper perimeter 30a of the substrate 24, to accommodate attachment of the vehicle device on the substrate 24. In one embodiment, as illustrated in FIGS. 2-4, the opening opens into the outer region 56 such that the outer region 56 is expanded near the upper perimeter 30a of the substrate 24. The opening may have any suitable shape, such as U-shaped configuration, as shown in FIGS. 2-4. In other embodiments, the opening is surrounded by the transparent layer 50 such that the opening is isolated from and does not extend into the outer region 56. If the opening is required, the transparent layer 50 may be modified to the extent necessary to enable the present invention to function properly.

The transparent layer 50 defines a first region 60 and a second region 62. The first and second regions 60, 62 are non-congruent to one another. Each of the first and second regions 60, 62 defines an area and a shape. As used herein, the term "non-congruent" generally means that the first and second regions 60, 62 do not coincide in shape or size. In other words, the first and second regions 60, 62 are geometrically non-congruent.

According to one embodiment, the term "non-congruent" is further defined as meaning that the area of the first region 60 is at least greater or less than 5% of the area of the second region 62. According to another embodiment, the term "non-congruent" is further defined as meaning that the shape of the first region 60 is at least 5% geometrically dissimilar than the shape of the second region 62. Geometric dissimilarity may be assessed by scaling (proportionally enlarging or reducing), rotating, translating, and/or reflecting the first and/or second regions 60, 62 such that the shapes of the first and second regions 60, 62 are as geometrically aligned as possible.

Figure 7:
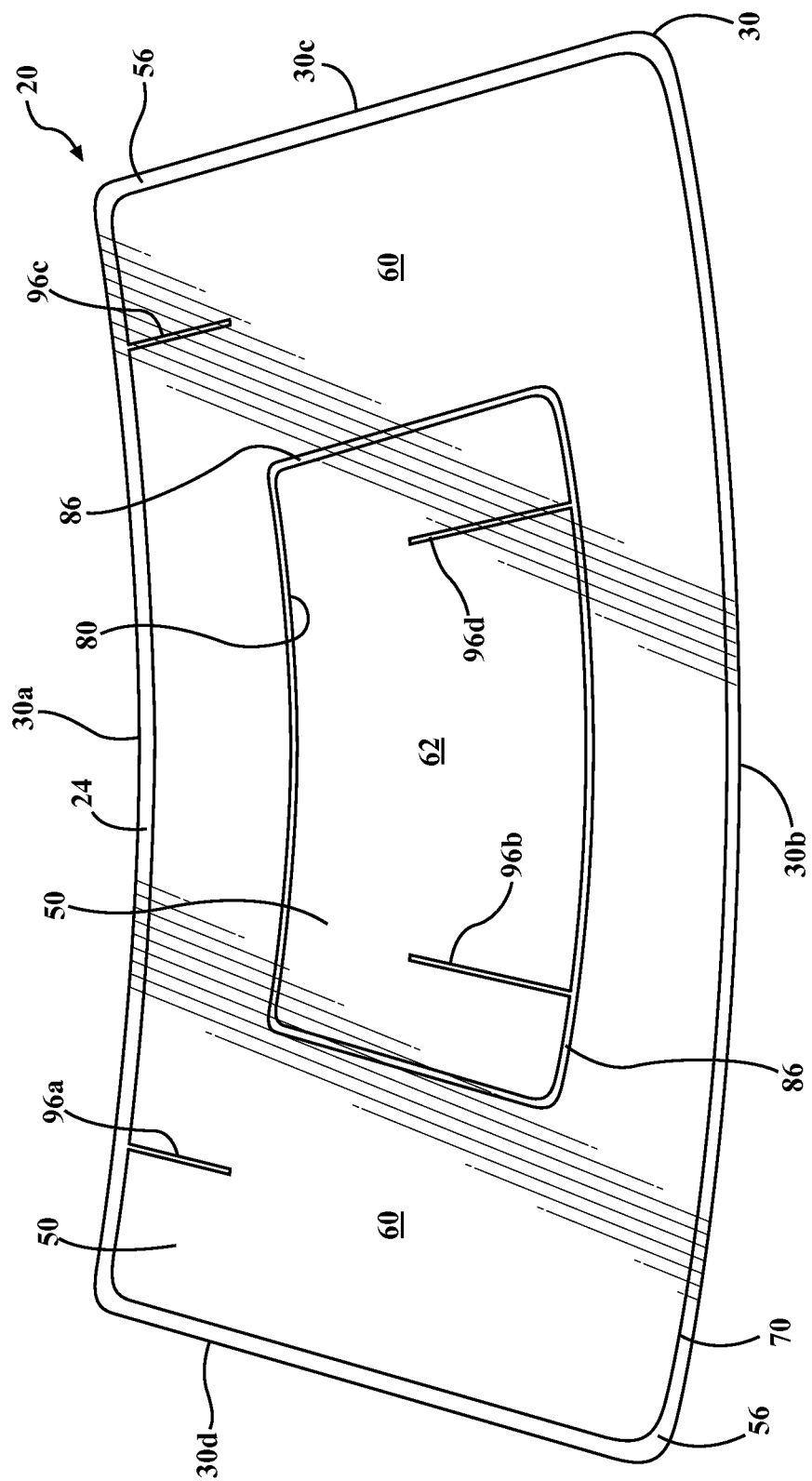
FIG. 7 is a plan view of the window assembly having the first region surrounding the second region such that the section cut surrounds the second region, and with the slits extending into the second region from the section cut, according to another embodiment of the invention.

The first and second regions 60, 62 may have various configurations. In one example, as illustrated in FIG. 5, the first and second regions 60, 62 have similar shapes but different areas such that the first and second regions 60, 62 are non-congruent. In other embodiments, the first and second regions 60, 62 may have similar areas but different shapes such that the first and second regions 60, 62 are non-congruent. In FIG. 7, the first region 60 entirely surrounds the second region 62. In FIG. 2, the first region 60 partially surrounds the second region 62

Figure 8:
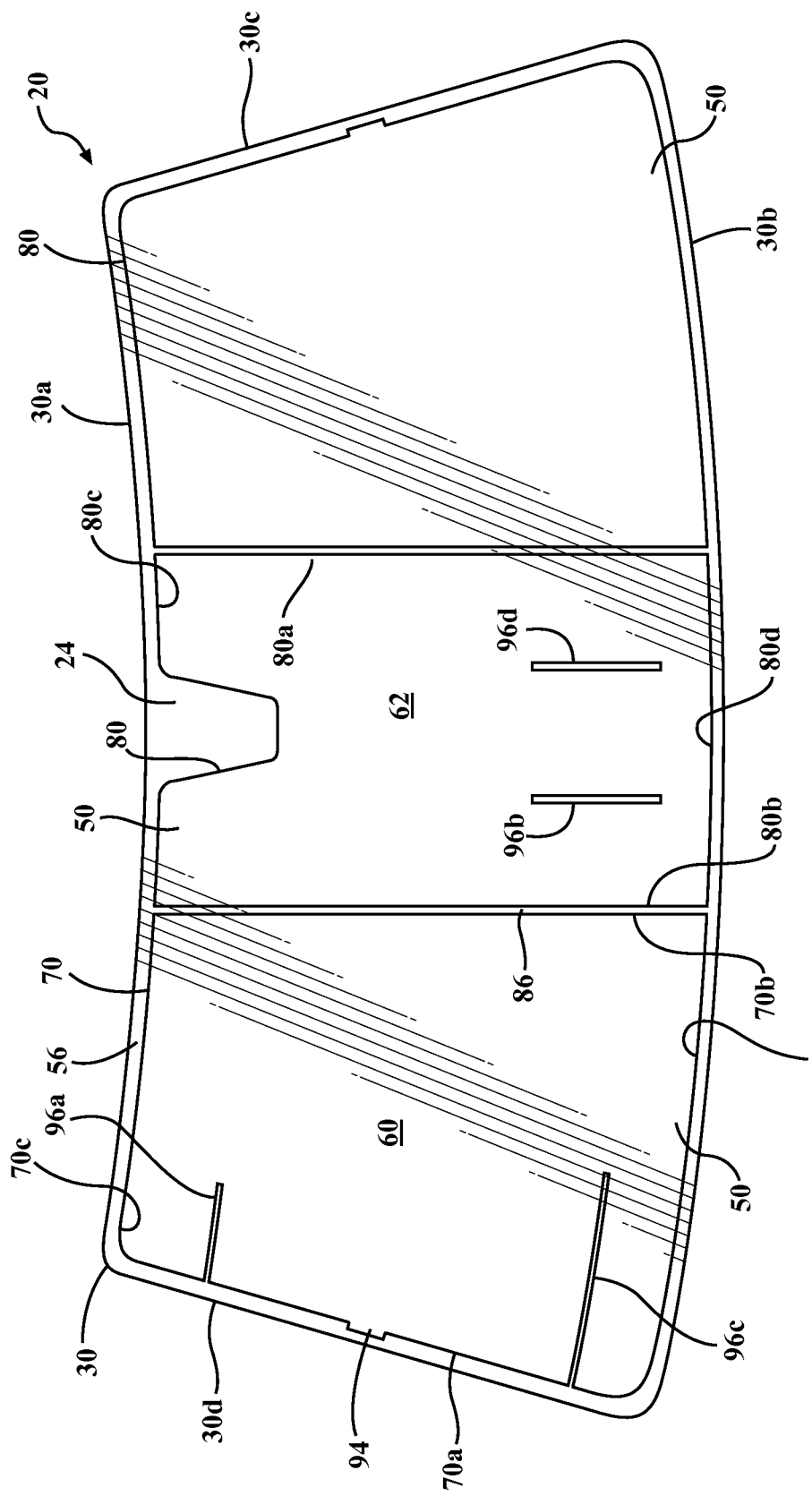
FIG. 8 is a plan view of the window assembly the first and second non-congruent regions and a third region being substantially similar to the first region, according to another embodiment of the invention.
Figure 9:
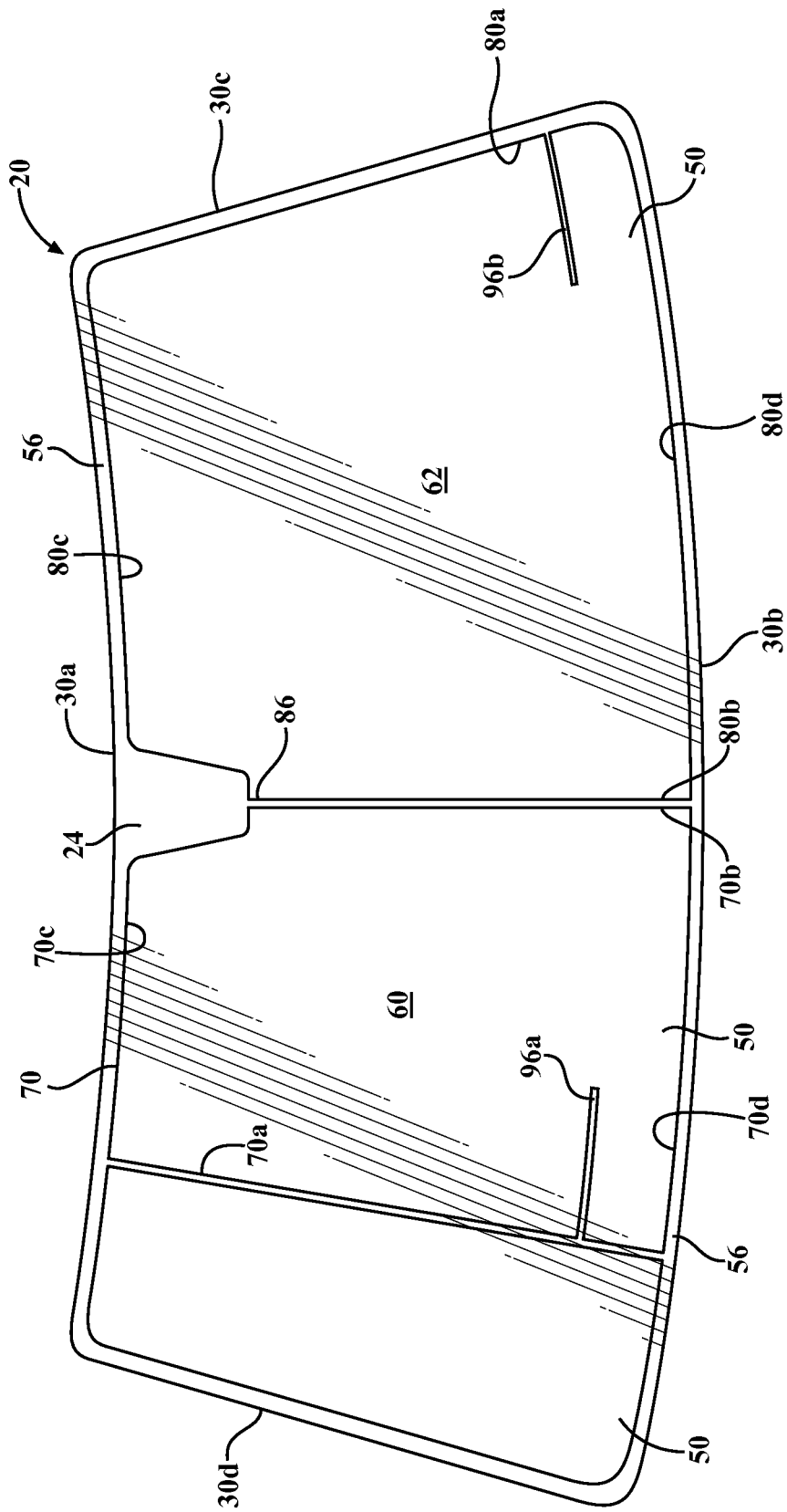
FIG. 9 is a plan view of the window assembly having the first and second non-congruent regions and a third region that is non-congruent with respect to both the first and second regions, according to another embodiment of the invention.

In other embodiments, the first and second regions 60, 62 may be among a plurality of regions defined in transparent layer 50. For example, as shown in FIGS. 8 and 9, the transparent layer 50 defines the first region 60, the second region 62, and a third region. In FIG. 8, the first region 60 and the third region are substantially congruent in size and shape while the second region 62 is non-congruent in relation to the first region 60 and the third region. In FIG. 9, the first region 60, the second region 62, and the third region are each non-congruent in relation to one another such that no two regions have the same size and shape.

The first region 60 defines a first periphery 70 and the second region defines a second periphery 80. Each of the first and second peripheries 70, 80 may include an outer edge 70a, 80a and an inner edge 70b, 80b. For each of the first and second peripheries 70, 80, the outer edge 70a, 80a typically opposes the inner edge 70b, 80b. As used herein, the term "inner" may be utilized to orient the first and second peripheries 70, 80 such that the inner edges 70b, 80b of the first and second peripheries 70, 80 are adjacent and face one another. In one embodiment, each of the first and second peripheries 70, 80 further includes a side edge 70c, 80c and an opposing side edge 70d, 80d that are connected to the outer edge 70a, 80a and inner edge 70b, 80b.

The first and second peripheries 70, 80 may have any suitable shape without departing from the scope of the invention. For instance, as shown predominately throughout the Figures, the first and second peripheries 70, 80 have a quadrilateral configuration. However, the first and second peripheries 70, 80 may have other configurations, including, but not limited to a circular or any polygonal configuration.

The first and second peripheries 70, 80 may be oriented with respect to the perimeter 30 of the substrate 24 according to various different configurations. As shown in one example in FIGS. 1, 3-5, 8 and 9, the inner edges 70b, 80b of each of the first and second peripheries 70, 80 are disposed substantially orthogonal to the upper and lower perimeter edges 30a, 30b of the substrate 24. In another example, as shown in FIG. 6, the inner edge 70b, 80b of each of the first and second peripheries 70, 80 is disposed substantially parallel to the upper and lower perimeter edges 30a, 30b of the substrate 24.

In one embodiment, the inner edge 70b of the first periphery 70 and the inner edge 80b of the second periphery 80 each have a linear configuration. The inner edges 70b, 80b may extend substantially parallel to one another. As shown in FIGS. 3-6, the inner edge 70b of the first periphery 70 and the inner edge 80b of the second periphery 80 may be spaced equally from the axis 40. In other words, the axis 40 is equidistant from the inner edges 70b, 80b. Preferably, the inner edges 70b, 80b are spaced apart by less than 10 mm. In other embodiments, the inner edges 70b, 80b may have nonlinear configurations such that the inner edges 70b, 80b do not extend parallel to one another. Moreover, the inner edges 70b, 80b may be spaced apart by any suitable distance, such as greater than 10 mm, as represented in FIG. 5.

The first and second regions 60, 62 are each configured to operate as an antenna element for transmitting and/or receiving radio frequency signals. Each of the first and second regions 60, 62 may be configured to transmit and/or receive linearly or circularly polarized radio frequency signals. Specifically, the linearly polarized RF signals which the first and second regions 60, 62 may transit and/or receive include, but are not limited to AM, FM, RKE (remote keyless entry), DAB (Digital Audio Broadcasting), and TV signals. The circularly polarized RF signals which the first and second regions 60, 62 may transmit and/or receive include, but are not limited to SDARS (satellite radio) or GPS signals. As shown in FIG. 1, an antenna receiver 82 is connected to the first and second regions 60, 20 to process the radio frequency signals received by the first and second regions 60, 62.

The non-congruent first and second regions 60, 62 allow for the first and second regions 60, 62 to operate at different frequencies thereby providing diversified antenna functionality to the window assembly 20. For instance, the first region 60 may be sized such that the first region 60 received TV signals while the second region 62 is sized such that the second region 62 receives FM signals. Generally, each of the first and second regions 60, 62 is configured to allow transmission and/or reception of one type of antenna frequency application. However, each of the first and second regions 60, 62 may be utilized for more than one type of antenna frequency application.

The first and second regions 60, 62 are spaced from one another by a section cut 86. The section cut 86 is devoid of the transparent layer 50 and is electrically non-conductive. Generally, the section cut 86 opens into the outer region 56 such that the section cut 86 and the outer region 56 form a common electrically non-conductive region. The section cut 86 is defined by the inner edge 70b, 80b of each of the first and second peripheries 70, 80. In the embodiments shown in FIGS. 1-9, the section cut 86 has a linear configuration as defined by the adjacent first and second regions 60, 62. The linear configuration of the section cut 86 may be defined by the adjacent inner edges 70b, 80b of the first and second peripheries 70, 80. As mentioned above, the inner edges 70b, 80b are preferably spaced by less than 10 mm. As such, the section cut 86 is preferably less than 10 mm wide. In other embodiments, the section cut 86 may have a non-linear configuration, such as a curvilinear configuration, and the like. As discussed above, the section cut 86 may be much wider than 10 mm, as shown in FIG. 5. The section cut 86 need not be a straight line. In other words, the section cut 86 may take other forms, such as a multi-segmented configuration, as shown in FIG. 2 or a closed loop configuration, as shown in FIG. 7.

The section cut 86 may be formed on substrate 24 according to any suitable technique known in the art. For instance, removal or deletion of the region of transparent layer 50 defining the section cut 86 may be accomplished using masking, lasers, abrasive tools, chemical removal, mechanical cutting tools, and the like.

As shown in FIG. 1, the window assembly 20 includes a feeding arrangement 90 that is coupled to the transparent layer 50, and more specifically to the first and second regions 60, 62. The feeding arrangement 90 energizes the first and second regions 60, 62 such that the first and second regions 60, 62 transmit and/or receive radio frequency signals. The first and second regions 60, 62 are connected to the antenna receiver 82 through the feeding arrangement 90.

With respect to the feeding arrangement 90, the term "energize" is understood to describe an electrical relationship between the feeding arrangement 90 and the first and second regions 60, 62 whereby the feeding arrangement 90 excites the first and second regions 60, 62 for transmission of radio waves, and is electrically coupled to the first and second regions 60, 62 for reception of impinging radio waves.

The feeding arrangement 90 may include any suitable configuration for energizing the first and second regions 60, 62. As shown in FIGS. 10 and 11, the feeding arrangement 90 typically includes at least one feeding element 92 for each region 60, 62. Generally, each of the first and second regions 60, 62 requires only one feeding element 92. However, a plurality of feeding elements 92 may be implemented with respect to any one of the first and second regions 60, 62 without departing from the scope of the invention. In one embodiment, as shown in FIG. 1, the feeding arrangement 90 includes two separate feeding elements 92 each of which is separately coupled to one of the first and second regions 60, 62. In another embodiment, the feeding arrangement 90 includes one feeding element 90 that is coupled to both the first and second regions 60, 62. The feeding element 92 may include any suitable material for energizing the first and second regions 60, 62. Additionally, the feeding element 92 may be of any suitable configuration, including, but not limited to a feeding strip, a feeding wire, or a combination of both.

The feeding element 92 may be disposed on any surface of the substrate 24. Furthermore, the feeding element 92 may be disposed coplanar or non-coplanar with respect to the transparent layer 50. As shown predominately throughout the Figures, each of the first and second regions 60, 62 may include a tab 94 of transparent layer 50 which integrally extends from the respective first and second regions 60, 62. The tabs 94 extend beyond the respective first and second peripheries 70, 80 into the outer region 56. The tabs 94 enable the feeding element 92 to be readily connected to the first and second regions 60, 62 without disruption of the field of view through the substrate 24.

According to one embodiment, as shown in FIG. 10, the feeding element 92 abuts and is in direct electrical connection with the transparent layer 50. Here, the feeding element 92 may be directly wired or soldered to the transparent layer 50. The feeding element 92 passes electrical current to the transparent layer 50 directly through an electrically conductive material, such as a feeding strip or wire, physically attached to the transparent layer 50. The feeding element 92 may abut and be in direct electrical connection while the transparent layer 50 is disposed on any layer of the substrate 24.

Alternatively, as shown in FIG. 11, the feeding element 92 may be spaced from and capacitively coupled to the transparent layer 50. In such instances, the feeding element 92 induces current to the transparent layer 50 through the air or a dielectric material, such as the exterior or interior substrates 26, 28. In such embodiments, the feeding element 92 is generally neither directly wired nor in direct contact with the transparent layer 50. The feeding element 92 is disposed generally non-coplanar with the transparent layer 50. The first and second regions 60, 62 may be energized by the feeding arrangement 90 according to other configurations not specifically recited herein.

As illustrated throughout the Figures, the first and second regions 60, 62 each define at least one performance enhancing slit 96 (hereinafter referred to as "slit" for simplicity) that is devoid of the transparent layer 50. In other words, the first region 60 defines at least a first slit 96a and the second region 62 defines at least a second slit 96b. The slits 96a, 96b are configured to operate as at least one of an impedance matching element and a radiation pattern altering element. In one embodiment, the slits 96a, 96b is configured to operate only as an impedance matching element. In another embodiment, the slits 96a, 96b are configured to operate only as a radiation pattern altering element. Of course, the slits 96a, 96b may be configured to operate as both an impedance matching element and a radiation pattern altering element at the same time. Moreover, one of the slits 96a may operate as an impedance matching element while the other slit 96b operates as a radiation pattern altering element, and vice-versa.

The slits 96a, 96b operate as an impedance matching element by matching impedance of the first and/or second regions 60, 62 with impedance of a cable. The cable, for example, may be a coaxial cable that is utilized in energizing the first and/or second regions 60, 62, as will be described below.

The slits 96a, 96b operate as a radiation pattern altering element by altering directions by which radio signals are transmitted and/or received from the first and/or second regions 60, 62. More specifically, the slits 96a, 96b may alter directions by which radio signal are transmitted and/or received such that the radiation pattern(s) of the first and/or second regions 60, 62 exhibit greater omni-directionality. The slits 96a, 96b enable greater control over radiation patterns and impedance characteristics of the first and second regions 60, 62 operating as antenna elements. The slits 96a, 96b help to counteract electromagnetic interference to ensure optimal efficiency. As such, the slits 96a, 96b enhance the performance of the first and/or second regions 60, 62. Preferably, the slits 96a, 96b are disposed such that the slits 96a, 96b cause minimal obstruction to the vision of the driver or passenger of the vehicle 22.

As mentioned above, the transparent layer 50, and more specifically the first and/or second regions 60, 62, may optionally further operate as defogging or defrosting elements. In such instances, the first region 60, the second regions 62, and/or the slits 96a, 96b may be modified to accommodate the optional defogging or defrosting capability of the transparent layer 50, without departing from the scope of this invention.

In one embodiment, the slits 96a, 96b have a linear configuration as defined by the transparent layer 50 of one of the first and second regions 60, 62. Preferably, the transparent layer 50 defining the linear configuration of the slits 96a, 96b is uniformly spaced by less than 2 mm. In other embodiments, the slits 96a, 96b have a non-linear configuration, such as a curvilinear configuration, a zigzag configuration, and the like.

The slits 96a, 96b may extend according to various suitable lengths. As shown predominately throughout the Figures, the first slit 96a may extend according to a first length and the second slit 96b may extend according to a second length whereby the first length is different than the second length. In one example, one of the slits 96a may have a length less than 100 mm while the other slit 96b has a length greater than 200 mm. The first slit 96a and the second slit 96b may be different lengths to accommodate the non-congruently sized first and second regions 60, 62. Alternatively, as shown in FIG. 3, the first slit 96a extends according to a first length and the second slit 96b extends according to a second length whereby the first length is equal to the second length.

The slits 96a, 96b may be formed on substrate 24 according to any suitable technique known in the art. For instance, removal or deletion of selected portions of the transparent layer 50 corresponding to the slit 96 may be accomplished using masking, lasers, abrasive tools, chemical removal, mechanical cutting tools, and the like.

According to one embodiment, as shown in FIGS. 3-5, the first region 60 defines a first slit 96a and the second region 62 defines a second slit 96b. The first and second slits 96a, 96b are positioned in relation to one another with respect to the axis 40. As shown in FIGS. 4 and 5, the first and second slits 96a, 96b are oriented substantially orthogonal to the axis 40. Alternatively, as shown in FIG. 3, the first and second slits 96a, 96b are oriented substantially parallel to the axis 40.

In another embodiment, as shown in FIGS. 1-4, 6, 7, and 9 the slits 96a, 96b extend into the first and second regions 60, 62 from the respective first and second peripheries 70, 80. For example, as shown in FIG. 4, the first slit 96a extends into the first region 60 from the first periphery 70 and the second slit 96b extends into the second region 62 from the second periphery 80. Here, the first and second slits 96a, 96b generally open into the outer region 56. In some instances, the first slit 96a, and not the second slit 96b, opens into the outer region 56. For example, as shown in FIG. 7, the first region 60 surrounds the second region 62 such that the second region 62 is disposed within the first region 60. Here, the first slit 96a opens into the outer region 56. The second slit 96b does not open into the outer region 56. Instead, the second slit 96b opens into section cut 86.

In one embodiment, the first slit 96a extends into the first region 60 from no more than one location on the first periphery 70. Similarly, the second slit 96b may extend into the second region 62 from no more than one location on the second periphery 80. In other words, in such instances, the first and second slits 96a, 96b do not extend across the respective first and second regions 60, 62 to the extent that the first and second slits 96a, 96b fully divide each of the respective first and second regions 60, 62 into smaller regions.

In another embodiment, as shown in FIG. 5, the slits 96a, 96b are defined within one of the first and second peripheries 70, 80 such that the slits 96a, 96b are surrounded by the transparent layer 50. For instance, in FIG. 5, the first slit 96a is defined within the first periphery 70 such that the first slit 96a is surrounded by the transparent layer 50 of the first region 60. Similarly, the second slit 96b is defined within the second periphery 80 such that the second slit 96b is surrounded by the transparent layer 50 of the second region 62. Here, the first and second slits 96a, 96b are spaced from and isolated from the outer region 56 such that the first and second slits 96a, 96b do not open into the outer region 56. Of course, any single one of the first and second slits 96a, 96b may be surrounded by the transparent layer 50 while the other one of the first and second slits 96a, 96b extends into one of the first and second regions 60, 62 from one of the respective first and second peripheries 70, 80.

In yet another embodiment, the first slit 96a extends substantially parallel to at least one of the side edge 70c or the opposing side edge 70d of the first periphery 70. Similarly, the second slit 96b may extend substantially parallel to at least one of the side edge 80c and the opposing side edge 80d of the second periphery 80. Alternatively, the first slit 96a may extend substantially parallel to the one of the outer and inner edges 70a, 70b of the first periphery 70. Similarly, the second slit 96b may extend substantially parallel to one of the outer and inner edges 80a, 80b of the second periphery 80.

In other embodiments, the first or second slit 96a, 96ab may extend at according to a predetermined angle with respect to any given side or edge of the first and second peripheries 70, 80 or the perimeter 30. For example, as shown in FIG. 6, the first and second slits 96a, 96b are angled inward toward a center of the window assembly 20 such that the first and second slits 96a, 96b extend neither parallel to nor orthogonal to the perimeter 30 or the first and second peripheries 70, 80. The predetermined angle in FIG. 6 is approximately 45 degrees with respect to perimeter edge 30b and side 30b of the second periphery 80. The predetermined angle may be defined according to other features of the window assembly 20, such as the section cut 86, the outer region 56, or the peripheries 70, 80.

The first and second regions 60, 62 may include more than one slit 96. As shown in FIGS. 3-8, the first and second regions 60, 62 each include a pair of slits 96. For example, in the embodiment of FIG. 4, the first region 60 defines the first slit 96a and a third slit 96c. The second region 62 defines the second slit 96b and a fourth slit 96d.

The first region 60 and the second region 62 need not have the same number of slits 96. The first region 60 and the second 62 region may define a different number of slits 96. For example, as shown in FIG. 2, the first region 60 has one slit 96a while the second region has two slits 96b, 96d. The first and second regions 60, 62 may include any combination of slits 96 as described herein without departing from the scope of the invention.

Figure 12:
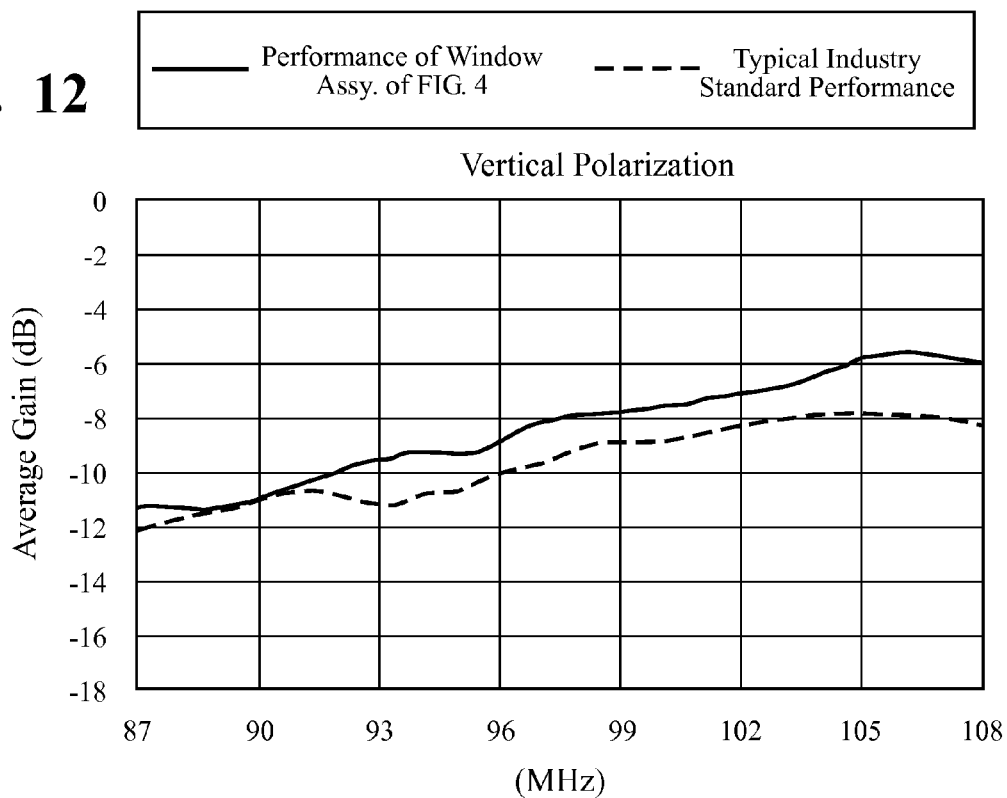
FIG. 12 is a chart illustrating vertically polarized antenna gain performance of the window assembly as compared with typical industry standard performance.
Figure 13:
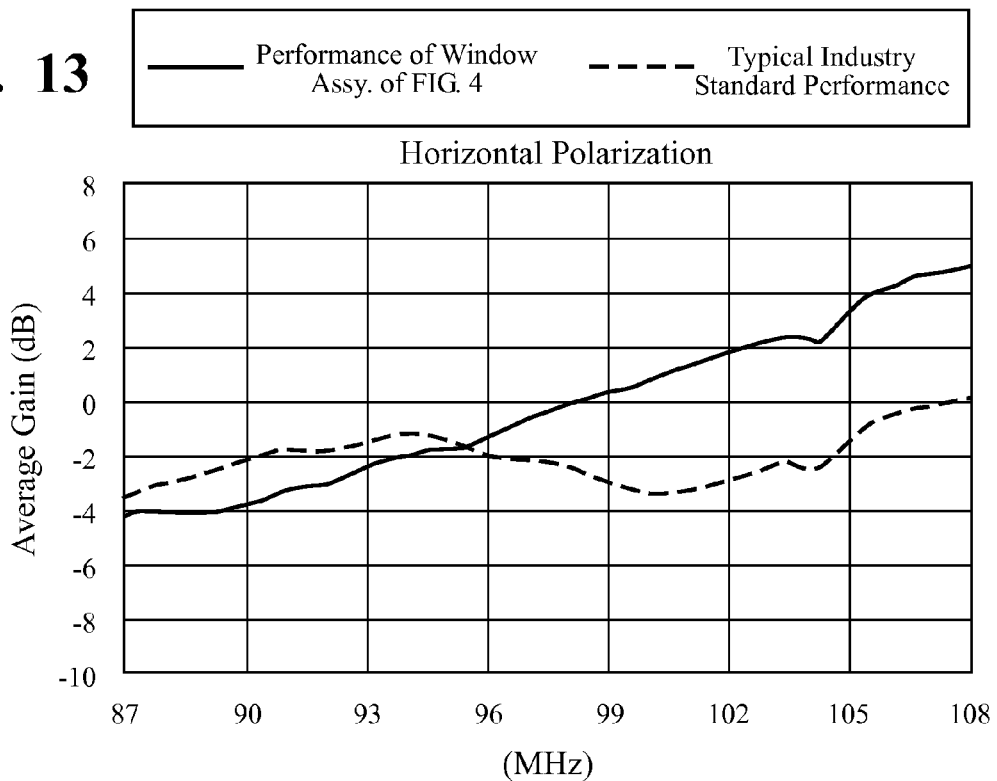
FIG. 13 is a chart illustrating horizontally polarized antenna gain performance of the window assembly as compared with typical industry standard performance.

The window assembly 20 of the subject invention exhibits greater antenna performance than typical industry standard antennas. FIG. 12 is a chart illustrating vertically polarized antenna gain performance of the window assembly 20 as compared with typical industry standard performance. FIG. 13 is a chart illustrating horizontally polarized antenna gain performance of the window assembly 20 as compared with typical industry standard performance. In FIGS. 12 and 13, the performance of the window assembly 20 from the embodiment in FIG. 4 is compared with typical industry standard performance. Although, it is to be appreciated that the window assemblies 20 of the various other embodiments as described and as illustrated in the Figures may exhibit such performance as the window assembly 20 of FIG. 4. As shown by the charts in FIGS. 12 and 13, the window assembly 20 exhibits a greater vertically and horizontally polarized average gain in dB than typical industry standard performance in the FM frequency range between 87-108 MHz. Specifically, in FIG. 12, the window assembly 20 consistently averages at least 10 dB greater vertically polarized average gain as compared to typical industry standard performance between 93-108 MHz. In FIG. 13, the window assembly 20 consistently averages at least 10 dB, and at some frequencies, upwards of 25 dB greater horizontally polarized average gain as compared to typical industry standard performance between 98-108 MHz.

The present invention has been described herein in an illustrative manner. It is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A window assembly for a vehicle, said window assembly comprising:
   a substrate that is substantially transparent and has a surface;
   a transparent layer that is disposed on said surface and comprises a metal compound such that said transparent layer is electrically conductive;
   said transparent layer defining a first region and a second region that are spaced from one another by a section cut that is devoid of said transparent layer, said first and second regions being non-congruent to one another; and
   a feeding arrangement coupled to said first and second regions to energize said first and second regions;
   wherein said first region defines a first performance enhancing slit that is devoid of said transparent layer; and
   wherein said second region defines a second performance enhancing slit that is devoid of said transparent layer.

2. The window assembly of claim 1 wherein said first region is a first antenna element and said second region is a second antenna element, said first and second antenna elements configured to transmit and/or receive radio signals.

3. The window assembly of claim 1 wherein said first and second regions are geometrically non-congruent to one another such that said first region and said second region transmit and/or receive radio signals of different frequency.

4. The window assembly of claim 1 wherein said first and second slits are each at least one of an impedance matching element and a radiation pattern altering element.

5. The window assembly of claim 1 wherein said first region defines a different number of said slits than said second region.

6. The window assembly of claim 1 wherein said first slit has a linear configuration as defined by said transparent layer of said first region, wherein said transparent layer defining said linear configuration of said first slit is uniformly spaced by 2 mm or less.

7. The window assembly of claim 1 wherein said first slit extends according to a first length and said second slit extends according to a second length, wherein said first length is not equal to said second length.

8. The window assembly of claim 1 wherein said first slit extends according to a first length and said second slit extends according to a second length, wherein said first length is substantially equal to said second length.

9. The window assembly of claim 1 wherein at least one of said first and second slits opens into said section cut.

10. The window assembly of claim 1 wherein said section cut has a width of less than 10 mm.

11. The window assembly of claim 1 wherein at least one of said first and second slits extends substantially parallel to said section cut.

12. The window assembly of claim 1 wherein at least one of said first and second slits extends substantially perpendicular to said section cut.

13. The window assembly of claim 1 wherein said first region defines a first periphery and said second region defines a second periphery, wherein said section cut is further defined between said first and second peripheries.

14. The window assembly of claim 13 wherein said first slit extends into said first region from said first periphery.

15. The window assembly of claim 13 wherein said first slit extends into said first region from no more than one location on said first periphery.

16. The window assembly of claim 13 wherein said first slit is defined within said first periphery such that said first slit is surrounded by said transparent layer of said first region.

17. The window assembly of claim 13 wherein said first periphery at least partially surrounds said second periphery.

18. The window assembly of claim 1 wherein said substrate defines a perimeter, and wherein an outer region is formed on said substrate between said transparent layer and said perimeter of said substrate, said outer region being electrically non-conductive.

19. The window assembly of claim 18 wherein at least one of said first and second slits opens into said outer region.

20. The window assembly of claim 18 wherein said section cut opens into said outer region.

21. The window assembly of claim 1 wherein said substrate includes an exterior substrate having an inner surface and an outer surface and an interior substrate disposed adjacent said exterior substrate having an inner surface and an outer surface.

22. The window assembly of claim 21 wherein said transparent layer is disposed between said inner surface of said interior substrate and said inner surface of said exterior substrate.

23. The window assembly of claim 1 wherein said transparent layer is configured to reduce transmission of infrared radiation through said substrate.

24. A window assembly for a vehicle, said window assembly comprising:
  a substrate that is substantially transparent and comprises an exterior substrate having an inner surface and an outer surface and an interior substrate disposed adjacent said exterior substrate having an inner surface and an outer surface;
  a transparent layer that comprises a metal oxide such that said transparent layer is electrically conductive, wherein said transparent layer is disposed between said exterior substrate and said interior substrate;
  said transparent layer defining a first region and a second region spaced from one another by a section cut that is devoid of said transparent layer; and
  a feeding arrangement coupled to said first and second regions to energize said first and second regions such that said first and second regions operate as antenna elements to transmit and/or receive radio frequency signals;
  said first and second regions being geometrically non-congruent to one another such that said first region and said second region transmit and/or receive different radio frequency signals;
  said first region defining a first performance enhancing slit that is devoid of said transparent layer; and
  said second region defining a second performance enhancing slit that is devoid of said transparent layer;
  wherein said first slit is configured to operate as at least one of an impedance matching element and a radiation pattern altering element with respect to said first region, and wherein said second slit is configured to operate as at least one of an impedance matching element and a radiation pattern altering element with respect to said second region.

\* \* \* \* \*